United States Patent
Boyd

(10) Patent No.: US 10,771,872 B2
(45) Date of Patent: Sep. 8, 2020

(54) TRAFFIC MANAGEMENT WITH LIMITED-BUFFER SWITCHES

(71) Applicant: Tibit Communications, Inc., Petaluma, CA (US)

(72) Inventor: Edward W. Boyd, Petaluma, CA (US)

(73) Assignee: Tibit Communications, Inc., Petaluma, CA (US)

( * ) Notice: Subject to any disclaimer, the term of this patent is extended or adjusted under 35 U.S.C. 154(b) by 0 days.

(21) Appl. No.: 16/653,731

(22) Filed: Oct. 15, 2019

(65) Prior Publication Data

US 2020/0120407 A1    Apr. 16, 2020

Related U.S. Application Data

(60) Provisional application No. 62/746,476, filed on Oct. 16, 2018.

(51) Int. Cl.
| | |
|---|---|
| *H04Q 11/00* | (2006.01) |
| *H04L 12/46* | (2006.01) |
| *H04L 12/823* | (2013.01) |
| *H04L 12/815* | (2013.01) |

(52) U.S. Cl.
CPC ..... *H04Q 11/0066* (2013.01); *H04L 12/4645* (2013.01); *H04L 47/22* (2013.01); *H04L 47/32* (2013.01); *H04Q 11/0067* (2013.01); *H04Q 2011/0084* (2013.01); *H04Q 2213/13522* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0135843 | A1* | 9/2002 | Gruia | H04B 10/272 398/167.5 |
| 2003/0137975 | A1* | 7/2003 | Song | H04Q 11/0062 370/353 |
| 2006/0268719 | A1* | 11/2006 | Takase | H04L 47/215 370/235.1 |
| 2008/0155087 | A1* | 6/2008 | Blouin | H04L 41/5006 709/223 |
| 2010/0067901 | A1* | 3/2010 | Mizutani | H04B 10/07955 398/20 |
| 2011/0182588 | A1* | 7/2011 | Wojtowicz | H04Q 11/0067 398/139 |
| 2012/0163799 | A1* | 6/2012 | Lee | H04L 41/0213 398/9 |
| 2015/0326479 | A1* | 11/2015 | Goodson | H04L 12/2854 370/236 |
| 2015/0350083 | A1* | 12/2015 | Goodson | H04L 47/783 370/236 |
| 2016/0301593 | A1* | 10/2016 | Blair | H04L 12/66 |
| 2017/0187632 | A1* | 6/2017 | Ko | H04B 10/278 |
| 2019/0288877 | A1* | 9/2019 | Babbellapati | H04W 88/16 |

* cited by examiner

*Primary Examiner* — Omar S Ismail
(74) *Attorney, Agent, or Firm* — Shun Yao; Park, Vaughan, Fleming & Dolwer LLP

(57) ABSTRACT

One embodiment provides a system and method for managing traffic in a network that includes at least a passive optical network (PON). During operation, the system obtains traffic status associated with the PON, generates a traffic-shaping factor for the PON based on the traffic status, and applies traffic shaping for each optical network unit (ONU) within the PON using the generated traffic-shaping factor. The traffic-shaping factor determines a portion of a best-effort data rate to be provided to each ONU.

16 Claims, 10 Drawing Sheets

TRAFFIC MANAGEMENT WITH LIMITED-BUFFER SWITCHES

RELATED APPLICATION

This application hereby claims priority under 35 U.S.C. § 119 to U.S. Provisional Patent Application No. 62/746,476, filed on 16 Oct. 2018, entitled "Traffic Management with Internal-Buffer Switches," by inventor Edward W. Boyd.

BACKGROUND

Field of the Invention

This disclosure is generally related to passive optical networks (PONs). More specifically, this disclosure is related to a method and a system for traffic management in PONs using switches with limited buffer capacity.

Related Art

Ethernet passive optical networks (EPONs) have become the leading technology for next-generation access networks. EPONs combine ubiquitous Ethernet technology with inexpensive passive optics, offering the simplicity and scalability of Ethernet with the cost-efficiency and high capacity of passive optics. With the high bandwidth of optical fibers, EPONs can accommodate broadband voice, data, and video traffic simultaneously.

In recent years, users' demands for bandwidths have grown rapidly, as applications of real-time video communications and video streaming have become popular. However, the bursty nature of traffic related to these applications can lead to heavy congestion in the network. In EPON, congestion can occur at access switches having limited buffer capacity.

SUMMARY

One embodiment provides a system and method for managing traffic in a network that includes at least a passive optical network (PON). During operation, the system obtains traffic status associated with the PON, generates a traffic-shaping factor for the PON based on the traffic status, and applies traffic shaping for each optical network unit (ONU) within the PON using the generated traffic-shaping factor. The traffic-shaping factor determines a portion of a best-effort data rate to be provided to each ONU.

In a variation on this embodiment, the traffic shaping can be applied by a service-provider bridge to reduce a transmission rate of packets destined to the PON.

In a variation on this embodiment, the traffic shaping can be applied by a respective ONU to reduce a request rate of packets destined to the ONU.

In a variation on this embodiment, the traffic status can include one or more of: bandwidth utilization and a packet-dropping rate.

In a further variation, generating the traffic-shaping factor can include: in response to determining that the bandwidth utilization or the packet-dropping rate exceeds a predetermined threshold, reducing the traffic-shaping factor to reduce the portion of the best effort data rate to be provided to each ONU.

In a further variation, generating the traffic-shaping factor can include: in response to determining that the bandwidth utilization or the packet-dropping rate is below a second predetermined threshold, increasing the traffic-shaping factor to increase the portion of the best-effort data rate to be provided to each ONU.

In a variation on this embodiment, the system receives a packet destined to a first ONU and, in response to determining that an amount of bandwidth used by the first ONU exceeds a guaranteed data rate provided to the first ONU, marks the packet as eligible for dropping.

In a further variation, in response to determining that congestion occurs at the PON, the system drops a packet destined to the PON marked as eligible for dropping.

In a further variation, marking the packet as eligible for dropping can include setting a predetermined bit in a service virtual local-area network (VLAN) tag.

In a variation on this embodiment, the traffic-shaping factor can be generated by one of: a network functions virtualization (NFV) switch, an optical line terminal (OLT) associated with the PON, and an access switch coupled to the PON.

BRIEF DESCRIPTION OF THE FIGURES

In the figures, like reference numerals refer to the same figure elements.

DETAILED DESCRIPTION

Overview

Embodiments of the present invention provide a system and method for managing traffic in an EPON implementing access switches having limited buffer capacity. To reduce congestion while keeping the packet-loss rate low, the system adaptively shapes traffic for each customer. More specifically, the per-customer traffic shaping can be performed based on current congestion status. The service provider can reduce the excess information rate (DR) provisioned to each customer based on the congestion status. A more congested network can lead to a greater reduction in the EIR. As a result, each customer has a reduced peak information rate (PR), thus reducing the possibility of congestion. When the congestion situation is improved, the service provider can increase the EIR for each customer again. Such traffic shaping can be performed at either end of the network. In some embodiments, downstream customer traffic can be shaped at the transmitter side (e.g., at the network gateway coupling the core network and the access network). In alternative embodiments, downstream customer traffic is shaped at the receiver side (e.g., at each optical network unit (ONU)). A similar scheme can be used to reduce upstream congestion.

Traffic Management in EPON

Figure 1:
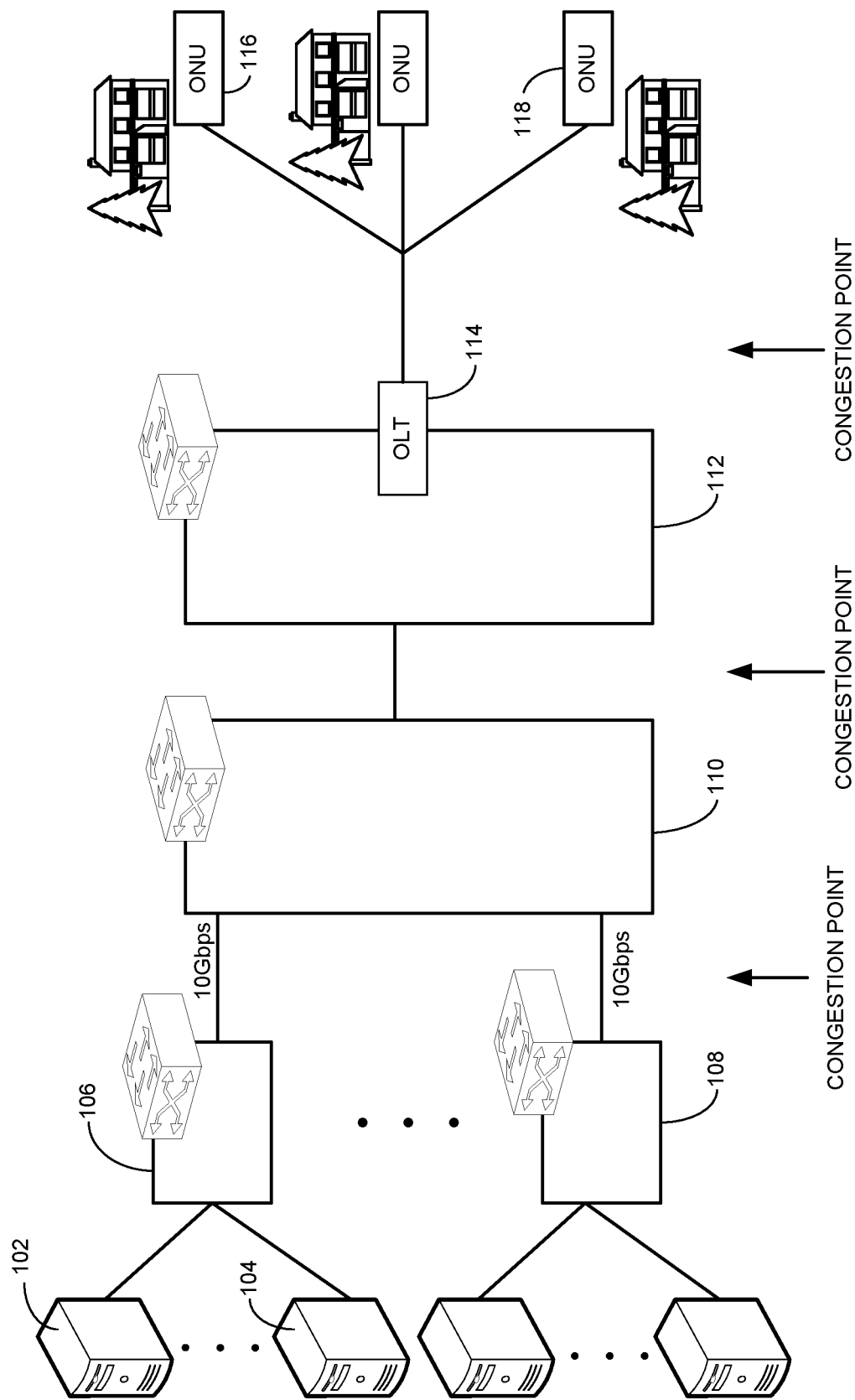
FIG. 1 illustrates an exemplary PON-based network.

FIG. 1 illustrates an exemplary PON-based network. Network 100 can include a number of network gateways (e.g., virtual broadband network gateway (vBNG) 102 and vBNG 104) coupling network 100 to the core network of the service provider. Network 100 can include multiple layers of switches, including a leaf-and-spine switch layer (which can include a mesh of switches, e.g., switches 106 and 108), access leaf (Aleaf) switches (e.g., Aleaf switch 110), and access switches (e.g., access switch 112). Note that an Aleaf switch can be a leaf switch that faces the access network, and an access switch can be coupled to a plurality of access networks (e.g., PONs). An access switch can include a plurality of optical line terminals (OLTs), with each OLT being coupled to a number of optical network units (ONUs). In the example shown in FIG. 1, an OLT 114 within access switch 112 can be coupled to a number of ONUs (e.g., ONUs 116 and 118).

FIG. 1 also demonstrates a number of network points where downstream congestion may occur. For example, congestion may happen at a downstream port of a leaf-and-spine switch when traffic from many vBNG servers goes to a same Aleaf switch. Similarly, downstream ports of Aleaf switches and access switches can also experience congestion. Congestion occurring at the leaf-and-spine switches can be managed by the vBNG servers. Embodiments of the present invention provide a solution to the problem of congestion occurring on the access switch.

Figure 2:
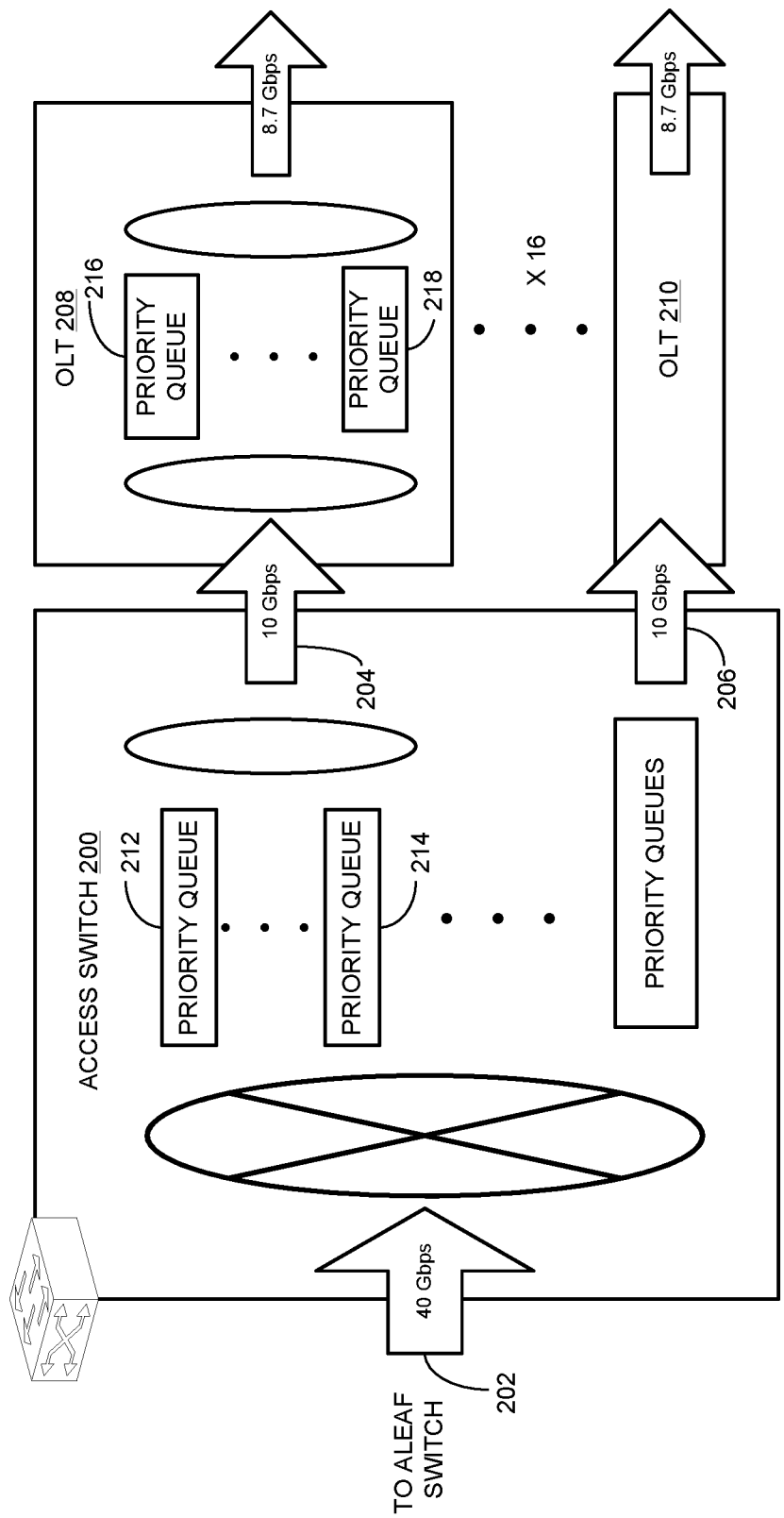
FIG. 2 demonstrates the architecture of a typical access switch.

FIG. 2 demonstrates the architecture of a typical access switch. Access switch 200 can include an uplink port 202 and a number (e.g., 16) of downlink ports (e.g., downlink ports 204 and 206). Uplink port 202 can be coupled to the upstream switch (e.g., an Aleaf switch). Each downlink port can include an OLT (e.g., OLTs 208 and 210), which can be a pluggable module (e.g., a small-form factor pluggable (SFP) OLT). In the example shown in FIG. 2, the bandwidth of uplink port 202 can be 40 Gbps, the bandwidth of each downlink port can be 10 Gbps, and there can be 16 downlink ports.

As one can see from FIG. 2, in the downstream direction, the output bandwidth of access switch 200 is 160 Gps, which is much larger than the 40 Gbps input bandwidth of access switch 200. As a result, congestion may happen at uplink port 202 if all downlink ports are requesting data. In general, traffic demands from multiple PONs (i.e., multiple OLTs) can easily exceed the 40 Gbps provided by the upper level switch (e.g., the Aleaf switch), thus causing congestion at the upper level switch. On the other hand, if all 40 Gbps traffic from uplink port 202 is destined to a single 10 Gbps downlink port, the OLT on that port can be overwhelmed. Note that the actual throughput for each OLT is slightly below 10 Gbps (e.g., 8.7 Gbps) due to the PON-related overhead as well as the forward error correction (FEC) overhead.

Providing buffering at access switch 200 can mitigate the congestion. Most access switches are internal buffer switches, which can have a much higher density, consume much lower energy, and cost much less than external buffer switches. However, internal-buffer switches have limited buffering capacity, meaning that buffering alone cannot resolve the congestion problem. In the example shown in FIG. 2, access switch 200 can include a number of data buffers (e.g., priority queues 212 and 214), and each OLT can also include a number of data buffers (e.g., priority queues 216 and 218). However, the limited buffer space may only ensure that higher priority traffic can be forwarded, whereas lower priority traffic may be dropped when the network is congested.

To address the congestion problem, some approaches can implement an access switch that shapes traffic on a per-customer, per-service basis. However, to do so, the access switch needs to have thousands of queues, thus increasing the cost as well as power consumption. Moreover, this does not resolve the congestion at the Aleaf switch, because traffic demand from multiple PONs may be well above the bandwidth of the Aleaf port.

Figure 3:
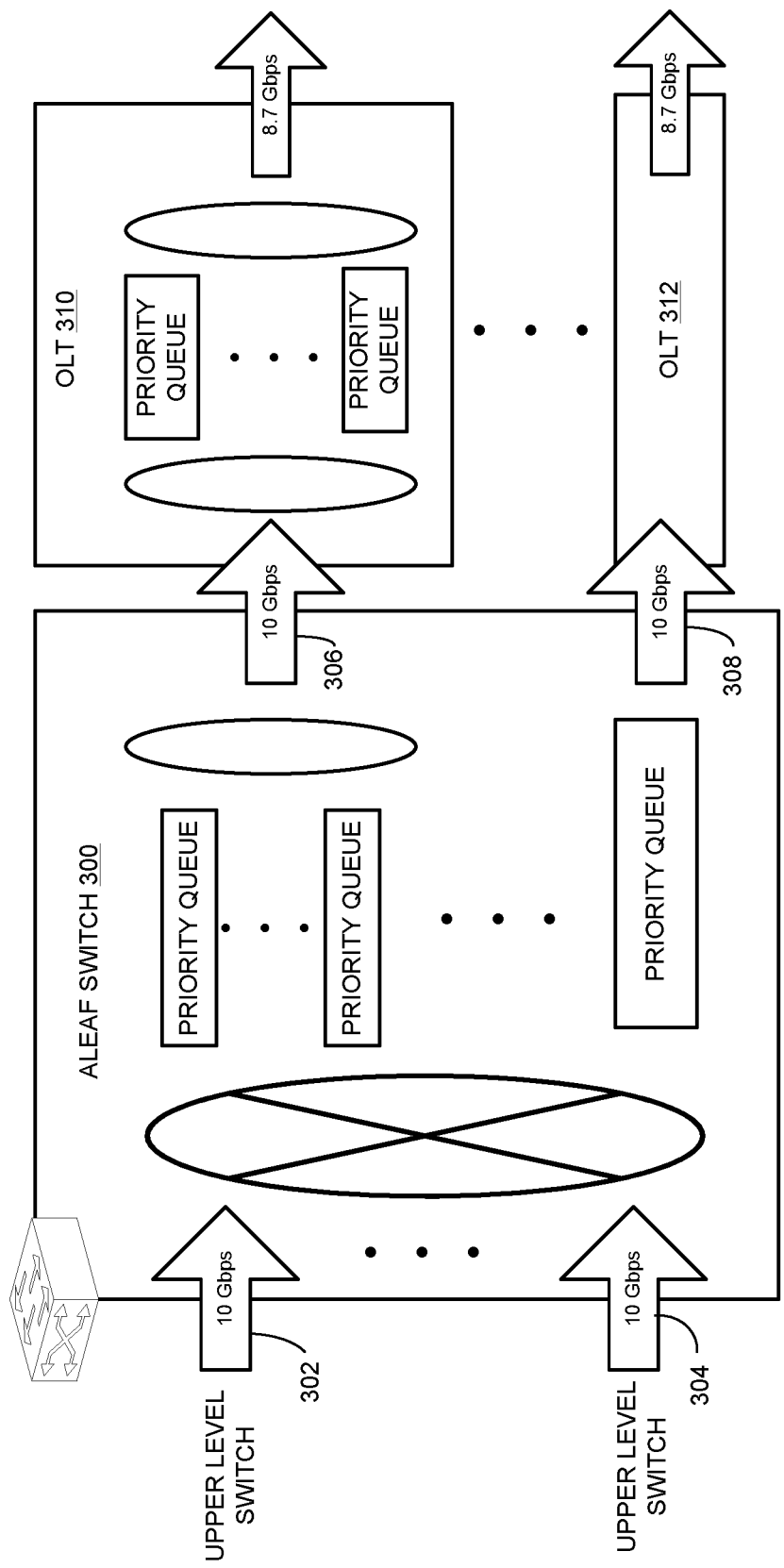
FIG. 3 shows a scenario where the OLTs are plugged into an access leaf (Aleaf) switch (prior art).

An alternative approach can involve directly plugging the OLT modules into the Aleaf switch. However, although this approach can remove congestion at the Aleaf switch, it cannot resolve the congestion at the OLT. FIG. 3 shows a scenario where the OLTs are plugged into an access leaf (Aleaf) switch (prior art). In FIG. 3, Aleaf switch 300 can include a number of uplink ports (e.g., ports 302 and 304) and a number of downlink ports (e.g., ports 306 and 308), with each uplink port being coupled to an upper level switch and each downlink port being coupled to a pluggable OLT (e.g., OLT 310 or 312). The speed of each uplink port can be similar to the speed of the downlink port, and the number of the downlink ports can be similar to the number of uplink ports. This way traffic demands from the downstream PONs can be satisfied by the upper level switches. No congestion will occur at the uplink of Aleaf switch 300. However, congestion can still occur at a downlink port or an OLT, if traffic from multiple uplink ports is directed to the same downlink port or same OLT.

To mitigate network congestion without requiring huge buffers on the access switch, in some embodiments, per-customer, per-service based traffic shaping can be implemented at edges of the network. More specifically, both the network gateways (e.g., the vBNG servers) and the ONUs can perform the per-customer, per-service traffic shaping. Note that the vBNG servers are responsible for managing subscribers, which can include shaping traffic on a per-customer, per-service basis. On the other hand, packet buffering at each ONU is naturally on a per-customer, per-service basis.

Typically, the vBNG servers shape traffic for each customer to the allowed excess information rate (EIR) or the best effort rate as defined by the service-level agreement (SLA). In other words, the vBNG servers ensure that the bandwidth provisioned to each customer does not exceed the best effort rate. However, simply limiting the bandwidth of each customer to the best effort rate does not resolve congestion in the network. More specifically, different vBNGs may serve a single PON that includes a plurality of ONUs, making infeasible to perform a group shaping for all customers on the PON. As a result, traffic demands from the PON may still cause congestion at the OLT. Moreover, because the vBNGs shape the customer traffic to the EIR, the assured information rate (AIR) of the best effort traffic may not be guaranteed. In the event of network congestion, the committed information rate (CIR) for each customer can be guaranteed and packets with higher priorities can be delivered via the priority queues, but packets with lower priorities may be dropped. The dropped packets will need to be retransmitted, which can cause delay and further congestion in the network. Note that, although shaping each customer's traffic to the AIR can guarantee the AIR for each customer, it will underutilize the bandwidth of the network and unnecessarily slow down the entire network.

When the vBNGs shape traffic for each customer to the EIR indiscriminatively, customers occupying excessive bandwidth can cause congestion for customers using a lesser amount of bandwidth. To increase fairness among customers and to ensure that the AIR can be guaranteed for all customers, in some embodiments, traffic marking can be implemented. More specifically, the vBNG servers can mark traffic of each customer based on whether the traffic for the customer is above or below the AIR. For example, the vBNG server can use the service virtual local area network (S-VLAN) tag to mark data packets. A data packet destined to a customer can be marked green if the bandwidth occupied by this particular customer is below the AIR. On the other hand, if the bandwidth occupied by the customer is above the AIR or EIR, data packets destined to that customer will be marked yellow. If there is no congestion in the network, all packets can pass through without being dropped. During congestion, yellow packets will be dropped, whereas green packets are ensured passage. This way, customers using bandwidth below the AIR will not see packet loss even in the event of network congestion.

Figure 4A:
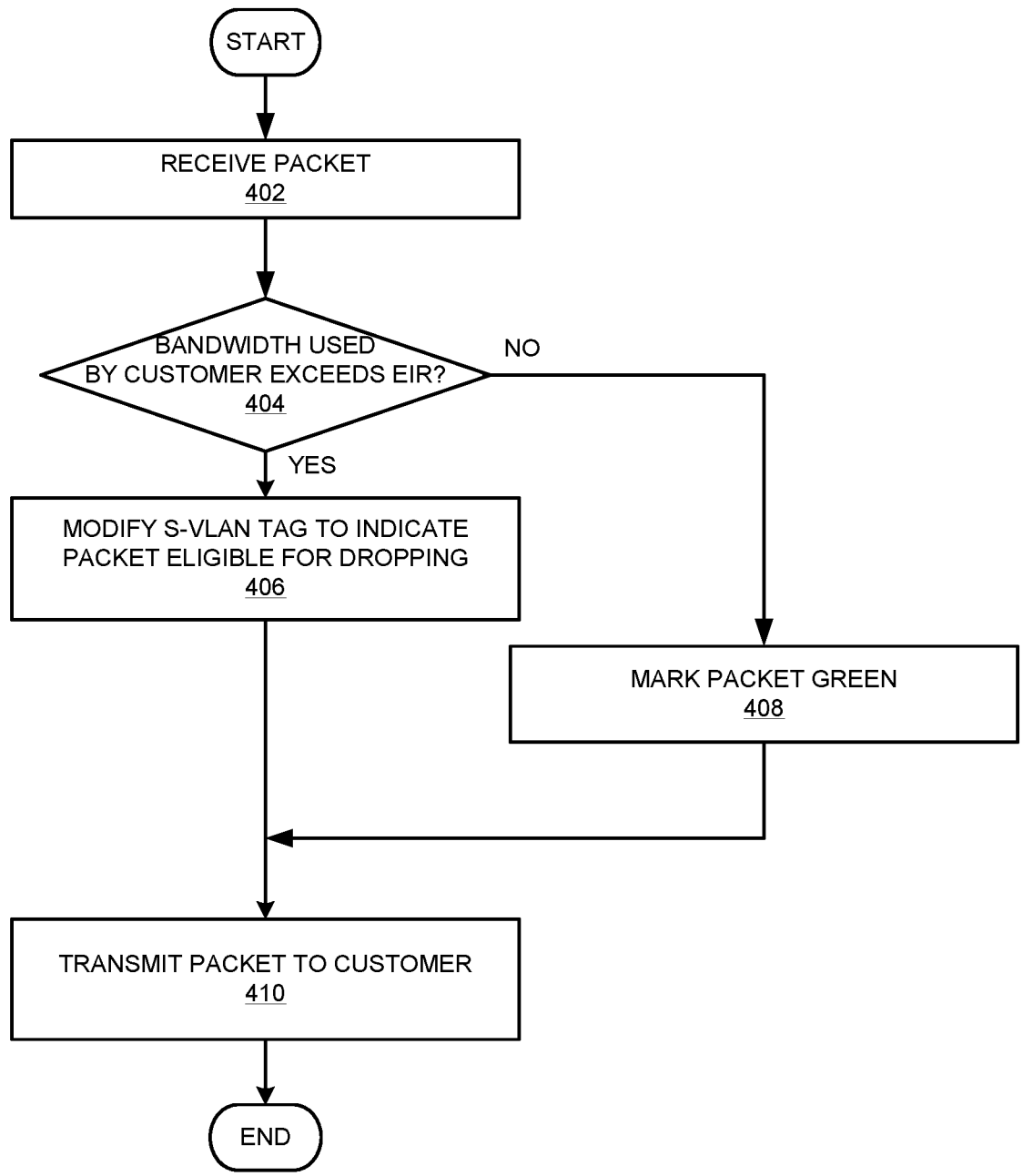
FIG. 4A illustrates a packet transmission process, according to one embodiment.

FIG. 4A illustrates a packet transmission process, according to one embodiment. During operation, a network gateway (e.g., a vBNG server) receives a packet destined to a customer (operation 402) and determines whether the bandwidth used by the customer exceeds the EIR of the customer (operation 404). If so, the network gateway modifies the S-VLAND tag attached to the packet to indicate that the packet is eligible for dropping (operation 406). More specifically, the network gateway can set a Drop Eligible Indicator (DEI) bit in the S-VLAN tag, indicating that the packet is yellow. If not, the network gateway can mark the packet green by clearing the DEI bit (operation 408). The network gateway can then transmit the packet to the customer through the network (operation 410).

Figure 4B:
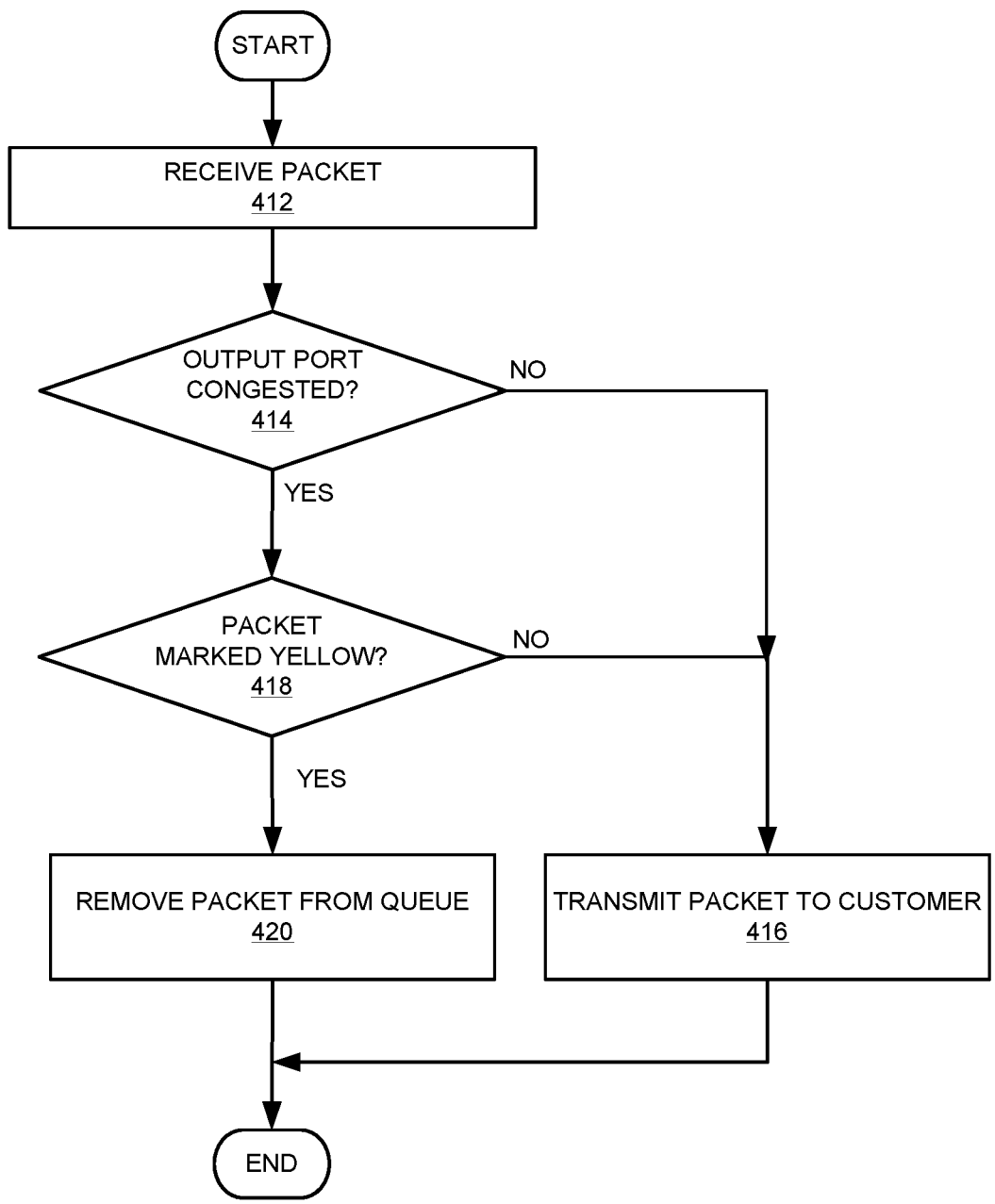
FIG. 4B illustrates a packet processing process at an access switch, according to one embodiment.

FIG. 4B illustrates a packet processing process at an access switch, according to one embodiment. During operation, an access switch receives a packet (operation 412) and determines whether the particular output port for outputting the packet is congested (operation 414). For example, the access switch can determine that the output port is congested if the utilized bandwidth of the output port exceeds a threshold (e.g., 90% of the maximum bandwidth has been utilized). If the output port is not congested, the access switch transmits the packet to the customer (operation 416). If the output port is congested, the access switch examines the S-VLAN tag attached to the packet to determine whether the packet is marked yellow (operation 418). If the packet is marked yellow, the access switch removes the packet from its priority queue (operation 420). If the packet is not yellow (i.e., the packet is a green packet), the access switch transmits the packet to the customer (operation 416). In alternative embodiments, the OLT coupled to the access switch can be responsible for processing the packet. In other words, the access switch sends the packet to the OLT, which can then determine whether to drop the packet based on its color marking.

Note that traffic marking and selective dropping can ensure AIR for each customer and can provide fairness among customers (customers using more bandwidth will see more of their packets dropped). However, dropping a customer's packets may significantly slow down the traffic for the customer, thus negatively affecting the user experience. Moreover, the dropped packets need to be re-transmitted, which can lead to further delay and congestion in the network. A better solution for reducing or eliminating congestion should avoid dropping packets. In some embodiments, in the event of network congestion (e.g., a congested OLT), the system may adaptively shape traffic for each customer. If an OLT is severely congested (the occupied bandwidth is approaching its maximum), the system can significantly reduce the speed of traffic for each customer coupled to the OLT. Consequently, congestion on the OLT can be mitigated without the need to drop packets. Similarly, if the OLT is slightly congested, the system can reduce the speed of traffic for each customer by a lesser amount. On the other hand, when the OLT is no longer congested, the system can resume the traffic speed for each customer. This way, although all customers in the congested PON may experience traffic slowdown during congestion, because the packet loss rate is low, the impact on the user experience can often be negligible.

Figure 5:
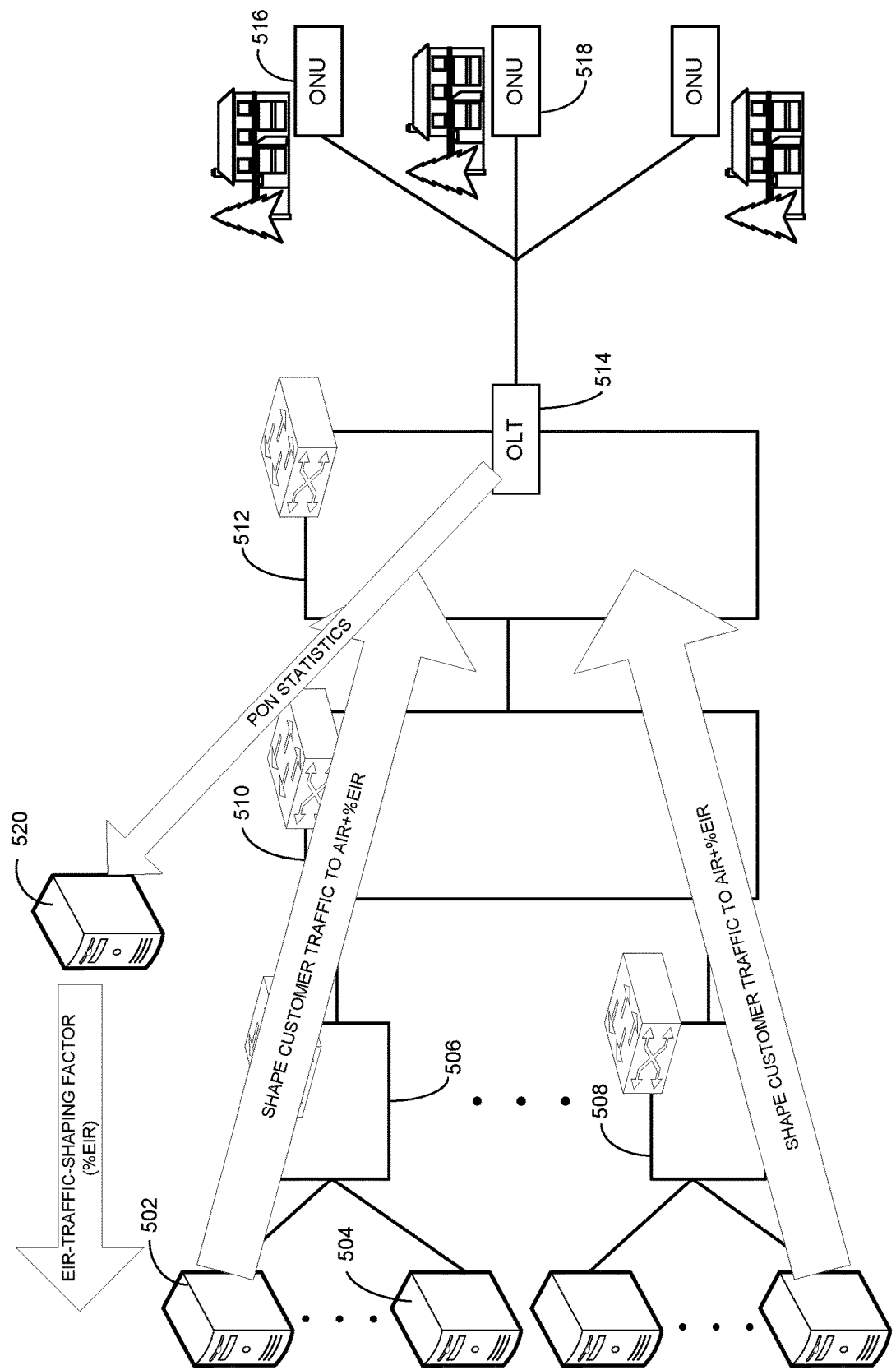
FIG. 5 presents a diagram illustrating an exemplary adaptive traffic-shaping scheme, according to one embodiment.

FIG. 5 presents a diagram illustrating an exemplary adaptive traffic-shaping scheme, according to one embodiment. In FIG. 5, network 500 comprises a number of provider gateways (e.g., vBNG servers 502 and 504), a number of leaf-and-spine switches (e.g., switches 506 and 508), an Aleaf switch 510, an access switch 512 coupled to a number of OLTs (e.g., OLT 514), and a number of ONUs (e.g., ONUs 516 and 518) coupled to OLT 514. The connection between Aleaf switch 510 and access switch 512 can have a bandwidth of 40 Gbps (e.g., a connection of 4×10 Gbps). The output bandwidth of each OLT on access switch 512 can be about 8.7 Gbps. The OLT bandwidth is slightly less than 10 Gbps due to the PON overhead and the FEC overhead.

FIG. 5 shows that access switch 512 sends PON statistics, which can be obtained from each individual OLT (e.g., OLT 514), to an external server 520, which can be a network functions virtualization (NFV) switch. External server 520 analyzes the PON statistics to determine whether an OLT is congested. For example, external server 520 can analyze the current packet drop rate. If an OLT drops packets at a rate above a predetermined threshold (e.g., 10%), external server 520 can determine that the OLT is congested. Similarly, external server 520 can analyze the current output bandwidth of an OLT. If the output bandwidth of an OLT is approaching its maximum output bandwidth (e.g., the current output bandwidth is 90% its maximum), external server 520 can determine that the OLT is congested.

If external server 520 determines that an OLT is congested, external server 520 can calculate an ER-traffic-shaping factor based on the congestion condition. In some embodiments, the EIR-traffic-shaping factor can be a percentage value, indicating a percentage of ER to be provided to customers. External server 520 sends the ER-traffic-shaping factor to the vBNG servers, which can then shape the traffic for each customer coupled to the OLT. More specifically, the transmission rate for each customer can be capped to the AIR plus the ER modified by the EIR-traffic-shaping factor. For example, if the traffic-shaping factor is about 80%, the transmission rate for each customer can be capped to the AIR plus 80% of the ER. Similarly, if the EIR-traffic-shaping factor is about 50%, the transmission rate for each customer can be capped at a rate equal to the AIR plus 50% of the EIR. As one can see, a lower EIR-traffic-shaping factor can result in the customer's traffic being slowed down further. On the other hand, if external server 520 determines that the OLT is underutilized (e.g., the bandwidth in use is less than 80% of the maximum bandwidth), external server 520 can increase the EIR-traffic-shaping factor and send the increased EIR-traffic-shaping factor to the vBNG servers. Consequently, the vBNG servers will increase the data transmission rate for the corresponding customers. In some embodiments, once the system determines that an OLT is no longer congested, the system can increase the allowed traffic rate for customers coupled to that OLT back to the maximum, which can be the AIR plus the EIR.

In the example shown in FIG. 5, an external server receives the PON statistics from the OLT, uses such statistics to calculate the EIR-traffic-shaping factor, and sends the EIR-traffic-shaping factor to the vBNG servers, which then perform the per-customer, per-service traffic shaping for each customer coupled to the OLT. In alternative embodiments, the access switch or the OLT can include a traffic-shaping-factor-generation module configured to generate a traffic-shaping factor based on PON statistics. More specifically, the traffic-shaping-factor-generation module located within the access switch or the OLT can send the traffic-shaping factor to the provider bridge to facilitate per-customer, per-service traffic shaping.

Figure 6:
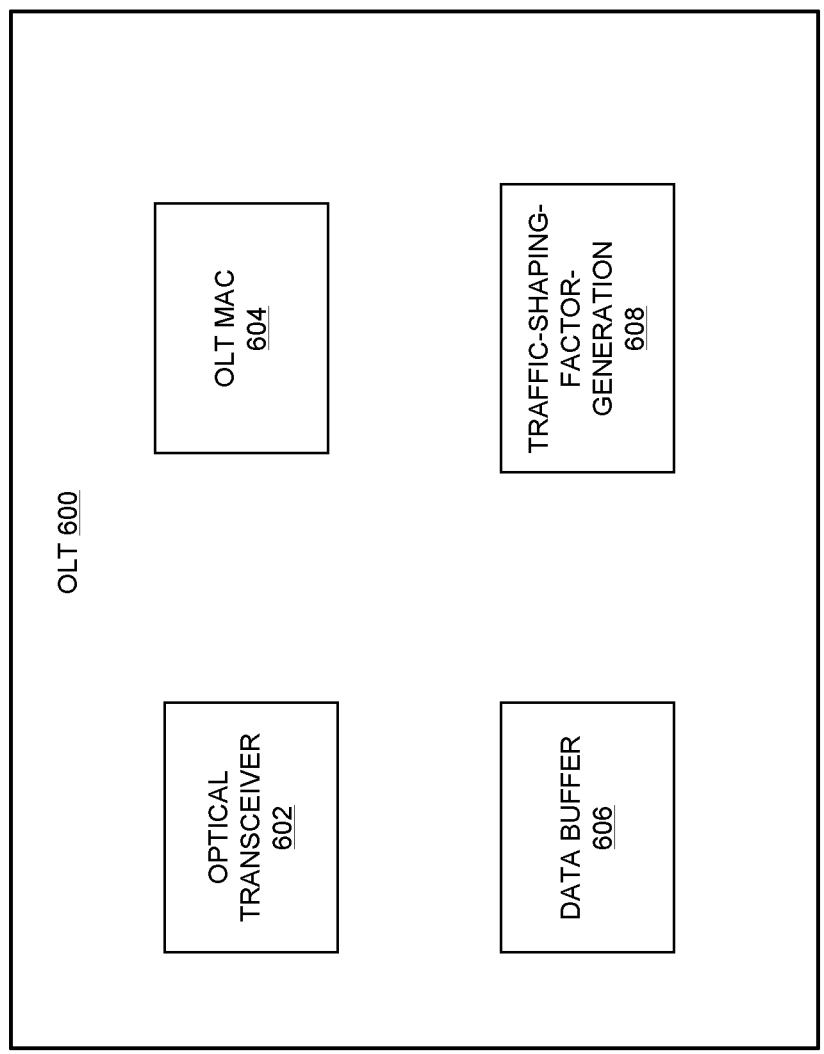
FIG. 6 illustrates the architecture of an exemplary OLT, according to one embodiment.

FIG. 6 illustrates the architecture of an exemplary OLT, according to one embodiment. More specifically, OLT 600 can be a hot-pluggable module that conforms to a standard form factor, including but not limited to: XENPAK, 10 gigabit small form-factor pluggable (XFP), small form-factor pluggable (SFP), enhanced small form-factor pluggable (SFP+), etc. OLT 600 can include an optical transceiver 602, an OLT MAC module 604, a data buffer 606, and a traffic-shaping-factor-generation module 608.

Optical transceiver 602 can include a standard optical transceiver (e.g., a 10 Gbps optical transceiver). OLT MAC module 604 can be responsible for performing various OLT MAC functions, such as controlling optical transceiver 602 and scheduling the transmission of ONUs coupled to OLT 600. Data buffer 606 can include a number (e.g., eight) of priority queues for queuing customer data having different priorities. Traffic-shaping-factor-generation module 608 can be responsible for generating the traffic-shaping factor. For example, traffic-shaping-factor-generation module 608 interfaces with OLT MAC module 604 to obtain statistics of the PON managed by OLT 600, such as the utilized bandwidth and/or the packet dropping rate. In some embodiments, the traffic-shaping factor can be a percentage value used to determine the amount of EIR to be provisioned to the customers. A higher percentage value means a higher downstream transmission rate for each customer.

Figure 7:
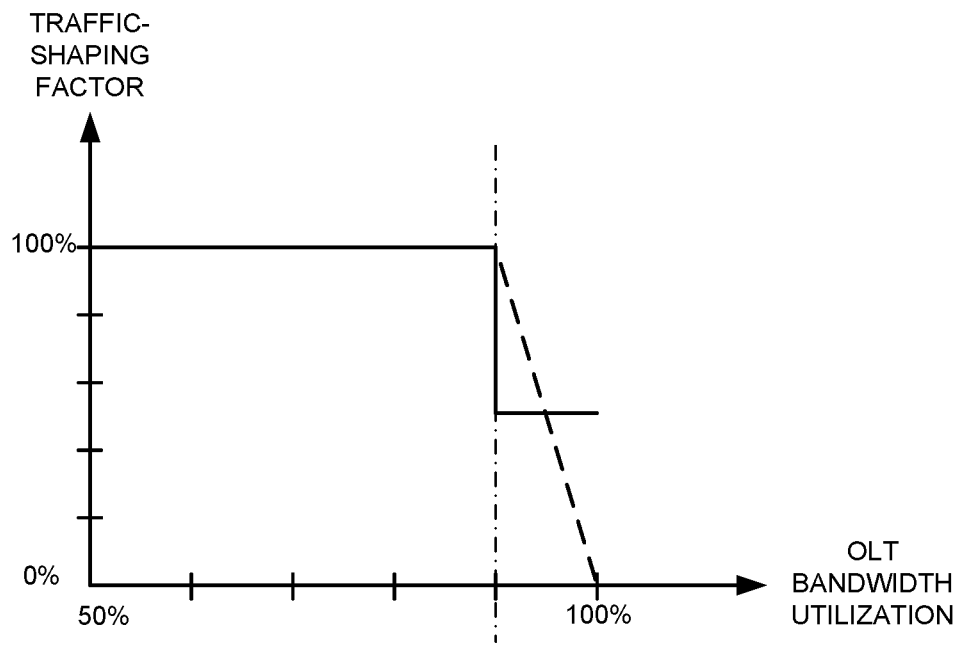
FIG. 7 illustrates an exemplary corresponding relationship between the utilized OLT bandwidth and the traffic-shaping factor, according to one embodiment.
Figure 7:
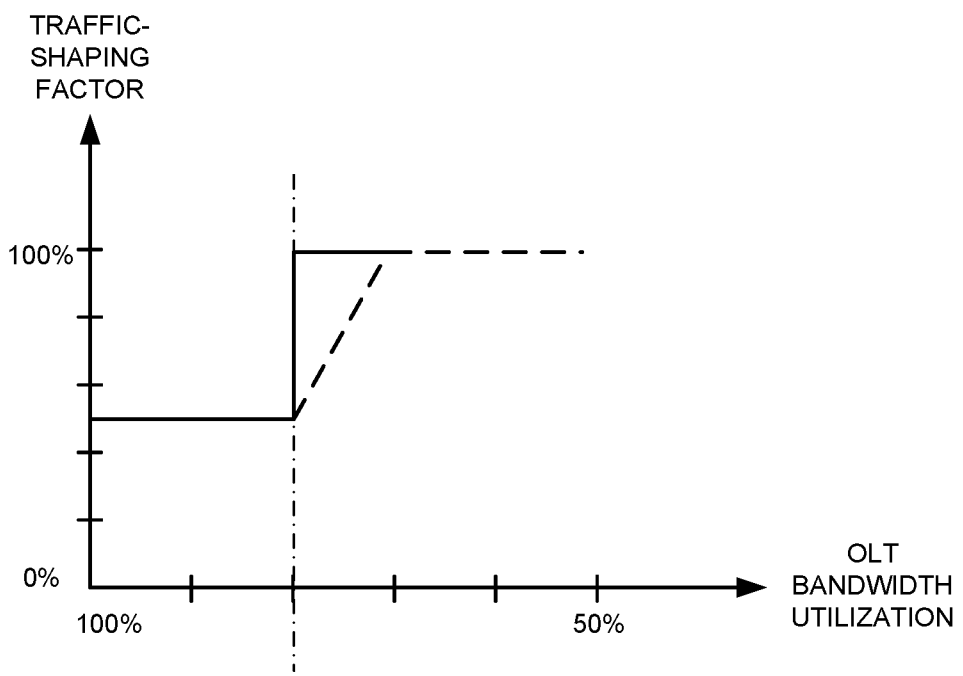

FIG. 7 illustrates an exemplary corresponding relationship between the utilized OLT bandwidth and the traffic-shaping factor, according to one embodiment. As shown in the top drawing of FIG. 7, when the percentage of the utilized OLT bandwidth exceeds a predetermined threshold (e.g., 90%), the traffic-shaping factor reduces from its maximum value (e.g., 100%) to a reduced value (e.g., 50%). In some embodiments, the traffic-shaping factor can be a step function (shown as the solid line). In alternative embodiments, the traffic-shaping factor can be inversely proportional to the utilized bandwidth (shown as the dashed line). The higher the utilized bandwidth, the lower the traffic-shaping factor. This means that, when the OLT is severely congested (i.e., when the utilized bandwidth is approaching its maximum value), the traffic-shaping factor can be set to a low value (e.g., close to 0%). By reducing the traffic-shaping factor, the system can reduce the transmission rate for each customer coupled to the OLT. As a result, the total amount of traffic destined to the OLT can be reduced, thus mitigating the congestion at the OLT.

The bottom drawing of FIG. 7 shows that, as the congestion situation is alleviated such that the percentage of the utilized OLT bandwidth is decreasing to below a second predetermined threshold (e.g., 80%), the traffic-shaping factor can increase from the lower percentage value to a higher value. In the case where the traffic-shaping factor is a step function, the traffic-shaping factor can revert to the maximum value when the utilized OLT bandwidth is below the second predetermined threshold. On the other hand, if the traffic-shaping factor is inversely proportional to the bandwidth utilization, the traffic-shaping factor can gradually increase to its maximum value as the bandwidth utilization decreases.

The traffic-shaping factor can be similarly dependent upon the packet dropping rate. For example, if the packet dropping rate is increasing beyond a predetermined threshold (e.g., 10%), the traffic-shaping factor can be decreased from its maximum 100% to a reduced value in ways similar to what is shown in the top drawing of FIG. 7. On the other hand, if the packet dropping rate is decreasing beyond a predetermined second threshold (e.g., 0.1%), the traffic-shaping factor can be increased from its reduced value in ways similar to what is shown in the bottom drawing of FIG. 7.

Returning to FIG. 6, traffic-shaping-factor-generation module 608 can send the generated traffic-shaping factor to the provider's bridge (e.g., the vBNGs) to allow the provider's bridge to shape the customers' traffic accordingly. For example, if the traffic-shaping factor is 80%, the provider's bridge (e.g., a vBNG server) can scale back the maximum allowed transmission rate for the customers to the AIR plus 80% of the EIR. Note that the AIR and DR are assured- and excess-information rates, respectively, provided by the service provider to the customers. By scaling back the EIR provided to all customers during congestion, the service provider can mitigate the congestion without the need to drop customers' packets. At the same time, the AIR for the customers is guaranteed.

Figure 8:
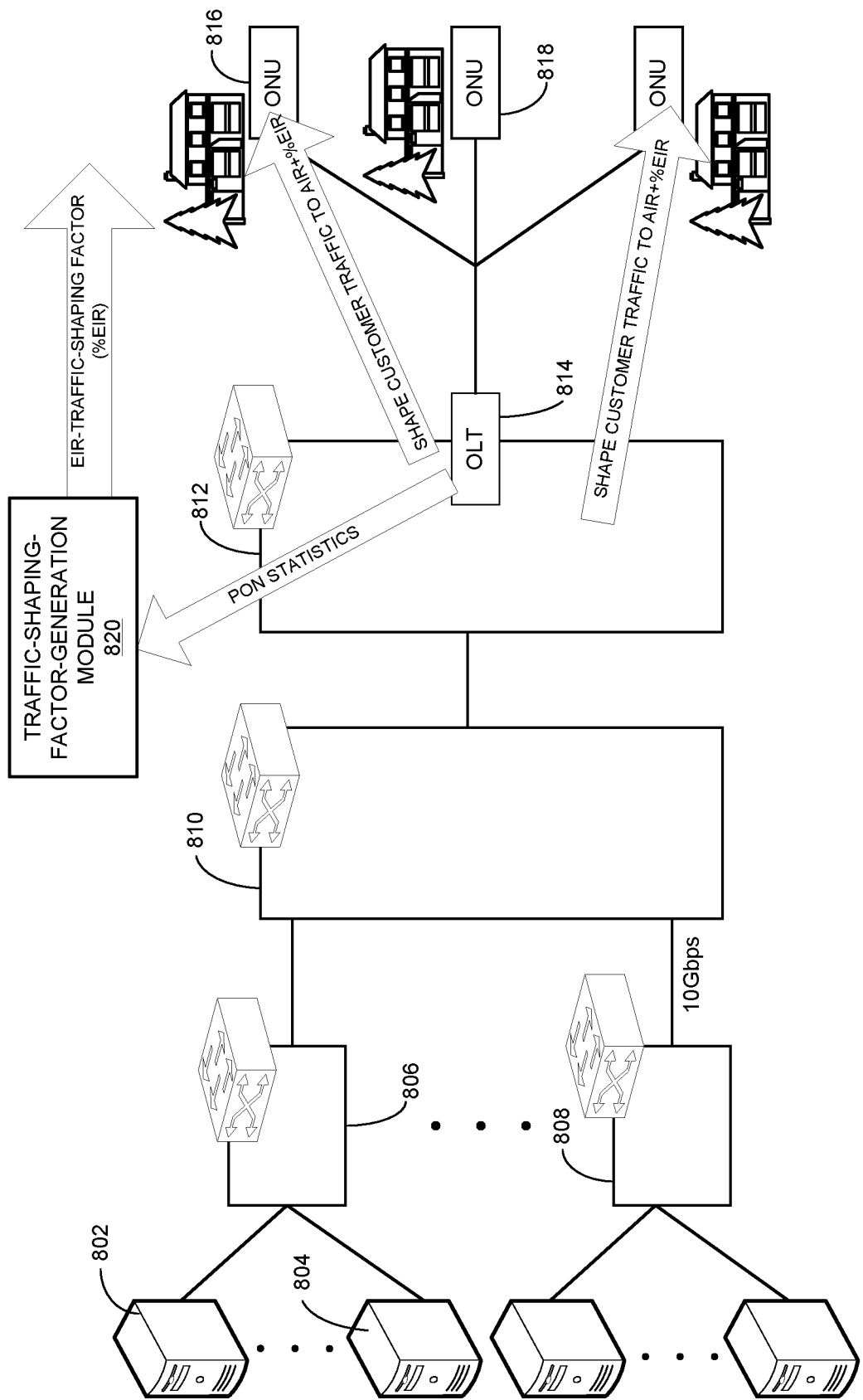
FIG. 8 presents a diagram illustrating an exemplary adaptive traffic-shaping scheme, according to one embodiment.

In the example shown in FIG. 5, the traffic-shaping factor is sent to the provider's bridge, which then uses the traffic-shaping factor to shape the customers' traffic. In practice, the traffic-shaping factor can be used by other types of devices at the edge of the network to shape traffic. For example, the ONUs can also use such a traffic-shaping factor to shape the customers' downstream traffic. FIG. 8 presents a diagram illustrating an exemplary adaptive traffic-shaping scheme, according to one embodiment. In FIG. 8, network 800 comprises a number of provider bridges (e.g., vBNG servers 802 and 804), a number of leaf-and-spine switches (e.g., switches 806 and 808), an Aleaf switch 810, an access switch 812 coupled to a number of OLTs (e.g., OLT 814), and a number of ONUs (e.g., ONUs 816 and 818 coupled to OLT 814). Network 800 can also include a traffic-shaping-factor-generation module 820 coupled to OLT 814.

During operation, traffic-shaping-factor-generation module 820 receives PON statistics for each PON from the OLTs and generates a traffic-shaping factor for each PON. More specifically, traffic-shaping-factor-generation module 820 can calculate a traffic-shaping factor for a particular PON based on the congestion status on the OLT that manages the PON. For example, traffic-shaping-factor-generation module 820 can generate, based on the congestion status of OLT 814, a traffic-shaping factor for ONUs coupled to OLT 814. Traffic-shaping-factor-generation module 820 can then send the traffic-shaping factor for a PON to all ONUs within the PON to allow each ONU to shape the downstream traffic. Note that, although the ONUs are at the receiving end of the downstream traffic, they can still determine the traffic rate in the downstream direction. More specifically, upon receiving the traffic-shaping factor, an ONU can reduce its data-request rate accordingly. For example, if the traffic-shaping factor is 80%, an ONU can reduce its data-request rate such that the ONU only requests data at a rate that is less than the AIR plus 80% of the DR. To ensure that the ONUs are performing the appropriate traffic shaping during congestion, the policer on the OLT can monitor and enforce the ONU-based traffic management such that, when congestion is detected, each ONU scales back its data request rate by a certain percentage.

In some embodiments, the traffic-marking and adaptive traffic-shaping can be combined to manage traffic in the network. More specifically, the adaptive traffic-shaping reduces congestion in the network by decreasing the best-effort rate provided to each customer by a certain percentage. Although the main goal is to mitigate congestion without dropping packets, in the event of heavy congestion, traffic-shaping alone may not be able to resolve congestion and packet dropping can become inevitable. In some embodiments, the traffic-marking and adaptive traffic-shaping can be performed concurrently. While the information rate for each ONU or customer is being scaled back, the OLT can drop packets marked yellow if the congestion remains (e.g., if the OLT bandwidth utilization is above a threshold value). Because the packets have been marked such that only those packets exceeding the AIR are eligible for dropping, this traffic-management scheme can ensure the AIR for all customers. The packet dropping can stop once the congestion is alleviated to a certain level (e.g., if the OLT bandwidth utilization is below a second threshold value).

A similar approach can also be used to manage traffic in the upstream direction. In the upstream direction, the ONUs report status of their priority queues and the OLT schedules transmissions of the ONUs based on the SLA. The OLT reports PON statistics, including the bandwidth usage and the packet dropping rate, to a traffic-shaping-factor-generation module. The traffic-shaping-factor-generation module can be located on an external server, or it can be part of the access switch or OLT. When congestion occurs in the network (either at the access switch or at the Aleaf switch), the OLT can adjust the amount of grants issued to the ONUs based on the traffic-shaping factor, which reflects the congestion status. In other words, the OLT can scale back the grants issued to ONUs when congestion occurs. In some embodiments, the OLT can reduce the best-effort transmission rate of each ONU by a certain percentage as indicated by the traffic-shaping factor. For example, if the traffic-shaping factor is 80%, the OLT schedules the transmission of each ONU such that each ONU is transmitting at a rate that is less than the AIR plus 80% of the EIR. In addition to adaptive traffic shaping, the OLT can also mark the packets transmitted by the ONUs. More specifically, packets transmitted above the AIR will be marked yellow, indicating that they are eligible for dropping.

Figure 9:
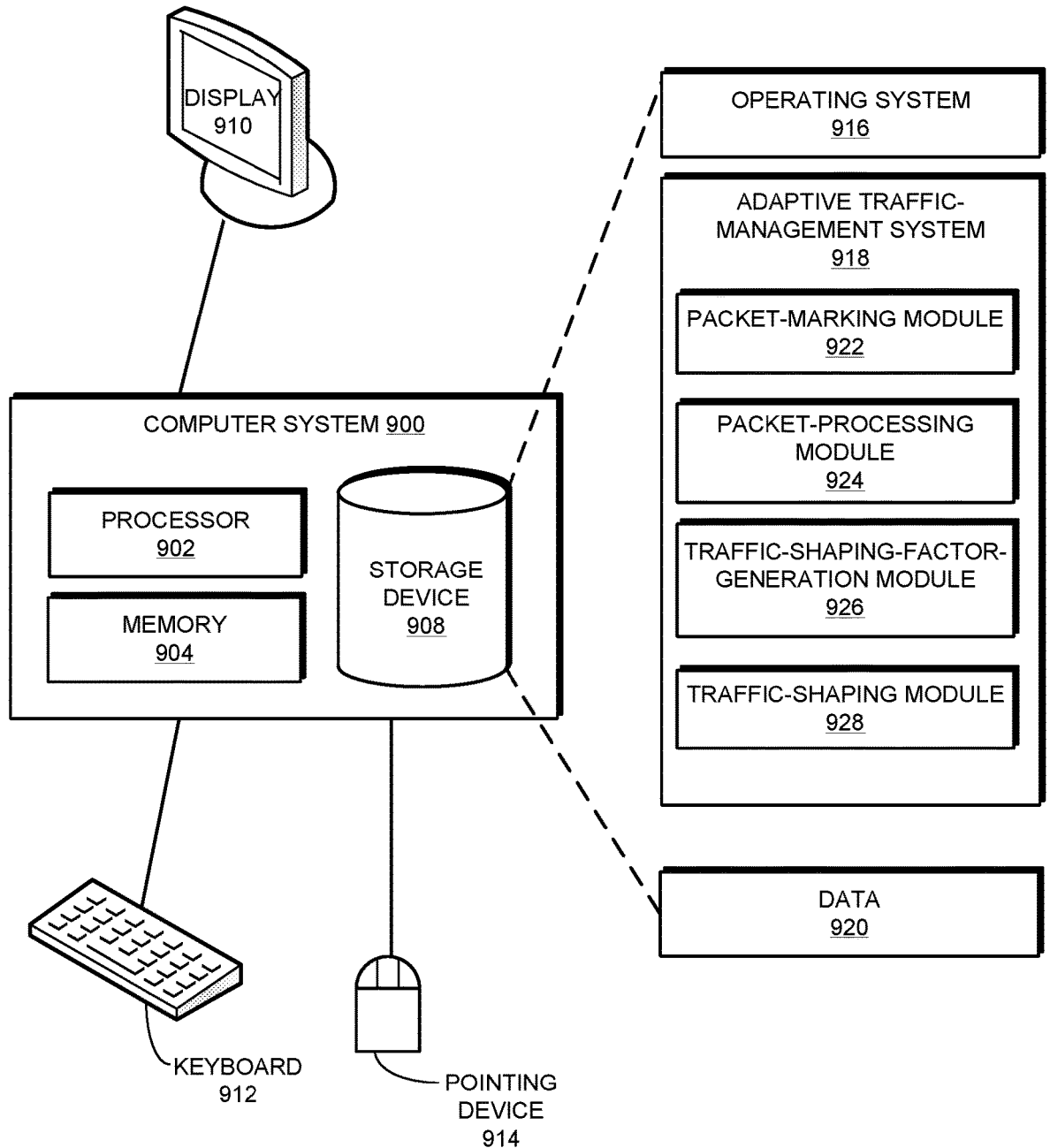
FIG. 9 illustrates an exemplary computer system that facilitates adaptive traffic management, according to one embodiment.

FIG. 9 illustrates an exemplary computer system that facilitates adaptive traffic management, according to one embodiment. In this example, a computer system 900 includes a processor 902, a memory device 904, and a storage device 908. Furthermore, computer system 900 can be coupled to a display device 910, a keyboard 912, and a pointing device 914. Storage device 908 can store code for an operating system 916, an adaptive traffic-management system 918, and data 920.

Adaptive traffic-management system 918 can include instructions, which when executed by processor 902 can cause computer system 900 to perform methods and/or processes described in this disclosure. Specifically, adaptive traffic-management system 918 can include instructions for implementing a packet-marking module 922 for color marking of customers' packets, a packet-processing module 924 for processing the color-marked packets, a traffic-shaping-factor-generation module 926 for generating a traffic-shaping factor for a PON based on the current congestion status of the PON, and a traffic-shaping module 928 for performing the per-customer, per-service traffic shaping.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-executable method for managing traffic in a network comprising at least a passive optical network (PON), comprising: obtaining traffic status associated with the PON, wherein the traffic status comprises one or more of: bandwidth utilization and a packet-dropping rate; generating a traffic-shaping factor for the PON based on the traffic status; and applying traffic shaping for each optical network unit (ONU) within the PON using the generated traffic-shaping factor, wherein the traffic-shaping factor determines a portion of a best-effort data rate to be provided to each ONU, and wherein generating the traffic-shaping factor comprises:
   in response to determining that the bandwidth utilization or the packet-dropping rate exceeds a predetermined threshold, reducing the traffic-shaping factor to reduce the portion of the best-effort data rate to be provided to each ONU.

2. The method of claim 1, wherein the traffic shaping is applied by a service-provider bridge to reduce a transmission rate of packets destined to the PON.

3. The method of claim 1, wherein the traffic shaping is applied by a respective ONU to reduce a request rate of packets destined to the ONU.

4. The method of claim 1, wherein generating the traffic-shaping factor comprises: in response to determining that the bandwidth utilization or the packet-dropping rate is below a second predetermined threshold, increasing the traffic-shaping factor to increase the portion of the best-effort data rate to be provided to each ONU.

5. The method of claim 1, further comprising: receiving a packet destined to a first ONU; in response to determining that an amount of bandwidth used by the first ONU exceeds a guaranteed data rate provided to the first ONU, marking the packet as eligible for dropping.

6. The method of claim 5, further comprising: in response to determining that congestion occurs at the PON, dropping a packet destined to the PON marked as eligible for dropping.

7. The method of claim 5, wherein marking the packet as eligible for dropping comprises setting a predetermined bit in a service virtual local-area network (VLAN) tag.

8. The method of claim 1, wherein the traffic-shaping factor is generated by one of:
   a network functions virtualization (NFV) switch;
   an optical line terminal (OLT) associated with the PON; and
   an access switch coupled to the PON.

9. An apparatus for managing traffic in a network comprising at least a passive optical network (PON), comprising:
   a PON status module configured to obtain traffic status associated with the PON, wherein the traffic status corn rises one or more of: bandwidth utilization and a packet-dropping rate;
   a traffic-shaping-factor-generation module configured to generate a traffic-shaping factor for the PON based on the traffic status; and
   a traffic-shaping module configured to apply traffic shaping for each optical network unit (ONU) within the PON using the generated traffic-shaping factor, wherein the traffic-shaping factor determines a portion of a best-effort data rate to be provided to each ONU, and wherein, while generating the traffic-shaping factor, the traffic-shaping-factor-generation module is configured to:
   in response to determining that the bandwidth utilization or the packet-dropping rate exceeds a predetermined threshold, reduce the traffic-shaping factor to reduce the portion of the best-effort data rate to be provided to each ONU.

10. The apparatus of claim 9, wherein the traffic-shaping module is located at a service-provider bridge and configured to reduce a transmission rate of packets destined to the PON.

11. The apparatus of claim 9, wherein the traffic-shaping module is located at a respective ONU and configured to reduce a request rate of packets destined to the ONU.

12. The apparatus of claim 9, wherein, while generating the traffic-shaping factor, the traffic-shaping-factor-generation module is configured to:
   in response to determining that the bandwidth utilization or the packet-dropping rate is below a second predetermined threshold, increase the traffic-shaping factor to increase the portion of the best-effort data rate to be provided to each ONU.

13. The apparatus of claim 9, further comprising a packet-marking module configured to:
   in response to determining that an amount of bandwidth used by a first ONU exceeds a guaranteed data rate provided to the first ONU, mark a packet destined to the first ONU as eligible for dropping.

14. The apparatus of claim 13, further comprising a packet-processing module configured to:
   in response to determining that congestion occurs at the PON, drop a packet destined to the PON marked as eligible for dropping.

15. The apparatus of claim 13, wherein, while marking the packet, the packet-marking module is configured to set a predetermined bit in a service virtual local-area network (VLAN) tag.

16. The apparatus of claim 9, wherein the traffic-shaping-factor-generation module R located on one of: a network virtualization functions (NFV) switch; an optical line terminal (OLT) associated with the PON; and an access switch coupled to the PON.

* * * * *

UNITED STATES PATENT AND TRADEMARK OFFICE
CERTIFICATE OF CORRECTION

PATENT NO. : 10,771,872 B2
APPLICATION NO. : 16/653731
DATED : September 8, 2020
INVENTOR(S) : Edward W. Boyd Page 1 of 3

It is certified that error appears in the above-identified patent and that said Letters Patent is hereby corrected as shown below:

In the Claims

Column 10, Line 37-Column 12, Line 38, (approx.) should read:
1. A computer-executable method for managing traffic in a network comprising at least a passive optical network (PON), comprising:
 obtaining traffic status associated with the PON, wherein the traffic status comprises one or more of: bandwidth utilization and a packet-dropping rate;
 generating a traffic-shaping factor for the PON based on the traffic status; and
 applying traffic shaping for each optical network unit (ONU) within the PON using the generated traffic-shaping factor, wherein the traffic-shaping factor determines a portion of a best-effort data rate to be provided to each ONU, and wherein generating the traffic-shaping factor comprises:
 in response to determining that the bandwidth utilization or the packet-dropping rate exceeds a predetermined threshold, reducing the traffic-shaping factor to reduce the portion of the best-effort data rate to be provided to each ONU.

2. The method of claim 1, wherein the traffic shaping is applied by a service-provider bridge to reduce a transmission rate of packets destined to the PON.

3. The method of claim 1, wherein the traffic shaping is applied by a respective ONU to reduce a request rate of packets destined to the ONU.

4. The method of claim 1, wherein generating the traffic-shaping factor comprises:
 in response to determining that the bandwidth utilization or the packet-dropping rate is below a second predetermined threshold, increasing the traffic-shaping factor to increase the portion of the best-effort data rate to be provided to Signed and Sealed this
Twenty-second Day of December, 2020

Andrei Iancu
*Director of the United States Patent and Trademark Office* each ONU.

5. The method of claim 1, further comprising:
   receiving a packet destined to a first ONU;
   in response to determining that an amount of bandwidth used by the first ONU exceeds a guaranteed data rate provided to the first ONU, marking the packet as eligible for dropping.

6. The method of claim 5, further comprising:
   in response to determining that congestion occurs at the PON, dropping a packet destined to the PON marked as eligible for dropping.

7. The method of claim 5, wherein marking the packet as eligible for dropping comprises setting a predetermined bit in a service virtual local-area network (VLAN) tag.

8. The method of claim 1, wherein the traffic-shaping factor is generated by one of:
   a network functions virtualization (NFV) switch;
   an optical line terminal (OLT) associated with the PON; and
   an access switch coupled to the PON.

9. An apparatus for managing traffic in a network comprising at least a passive optical network (PON), comprising:
   a PON status module configured to obtain traffic status associated with the PON, wherein the traffic status comprises one or more of: bandwidth utilization and a packet-dropping rate;
   a traffic-shaping-factor-generation module configured to generate a traffic-shaping factor for the PON based on the traffic status; and
   a traffic-shaping module configured to apply traffic shaping for each optical network unit (ONU) within the PON using the generated traffic-shaping factor, wherein the traffic-shaping factor determines a portion of a best-effort data rate to be provided to each ONU, and wherein, while generating the traffic-shaping factor, the traffic-shaping-factor-generation module is configured to:
   in response to determining that the bandwidth utilization or the packet-dropping rate exceeds a predetermined threshold, reduce the traffic-shaping factor to reduce the portion of the best-effort data rate to be provided to each ONU.

10. The apparatus of claim 9, wherein the traffic-shaping module is located at a service-provider bridge and configured to reduce a transmission rate of packets destined to the PON.

11. The apparatus of claim 9, wherein the traffic-shaping module is located at a respective ONU and configured to reduce a request rate of packets destined to the ONU.

12. The apparatus of claim 9, wherein, while generating the traffic-shaping factor, the traffic-shaping-factor-generation module is configured to:
    in response to determining that the bandwidth utilization or the packet-dropping rate is below a second predetermined threshold, increase the traffic-shaping factor to increase the portion of the best-effort data rate to be provided to each ONU.

13. The apparatus of claim 9, further comprising a packet-marking module configured to:
    in response to determining that an amount of bandwidth used by a first ONU exceeds a guaranteed data rate provided to the first ONU, mark a packet destined to the first ONU as eligible for dropping.

14. The apparatus of claim 13, further comprising a packet-processing module configured to:
    in response to determining that congestion occurs at the PON, drop a packet destined to the PON marked as eligible for dropping.

15. The apparatus of claim 13, wherein, while marking the packet, the packet-marking module is configured to set a predetermined bit in a service virtual local-area network (VLAN) tag.

16. The apparatus of claim 9, wherein the traffic-shaping-factor-generation module is located on one of:
    a network virtualization functions (NFV) switch;
    an optical line terminal (OLT) associated with the PON; and
    an access switch coupled to the PON.